United States Patent [19]
Paxton et al.

[11] Patent Number: 5,425,550
[45] Date of Patent: Jun. 20, 1995

[54] UNPERFORATED SLIDE-IN PASSENGER SIDE AIRBAG MODULE CUSHION COVER

[75] Inventors: Donald J. Paxton, Brigham City; Bryan D. Matzl, North Ogden; David J. Green, Brigham City, all of Utah

[73] Assignee: Morton International, Inc., Chicago, Ill.

[21] Appl. No.: 191,959

[22] Filed: Feb. 4, 1994

[51] Int. Cl.6 ............................................. B60R 21/16
[52] U.S. Cl. ........................... 280/728.3; 280/732; 280/728.2
[58] Field of Search .............. 280/728 A, 728 B, 731, 280/732, 743 R

[56] References Cited

U.S. PATENT DOCUMENTS

| | | | |
|---|---|---|---|
| 4,941,678 | 7/1990 | Lauritzen et al. | 280/732 |
| 4,989,897 | 2/1991 | Takada | 280/728 B |
| 5,058,919 | 10/1991 | Paquette et al. | 280/732 |
| 5,167,427 | 12/1992 | Baba | 280/728 B |
| 5,342,082 | 8/1994 | Kriska et al. | 280/728 A |
| 5,344,182 | 9/1994 | Lauritzen et al. | 280/728 A |

*Primary Examiner*—Kenneth R. Rice
*Attorney, Agent, or Firm*—George W. Rauchfuss, Jr.; Gerald K. White

[57] ABSTRACT

A passenger side airbag module includes a reaction canister whose sidewalls define a pair of channels on opposite sides of its open mouth. An unperforated cushion cover carries a pair of splines which are engaged by the channels. One spline/channel combination locks the cover securely to the canister. The other spline/channel combination forms a snap-fit engagement which disengages under the force of the expanding airbag.

7 Claims, 2 Drawing Sheets

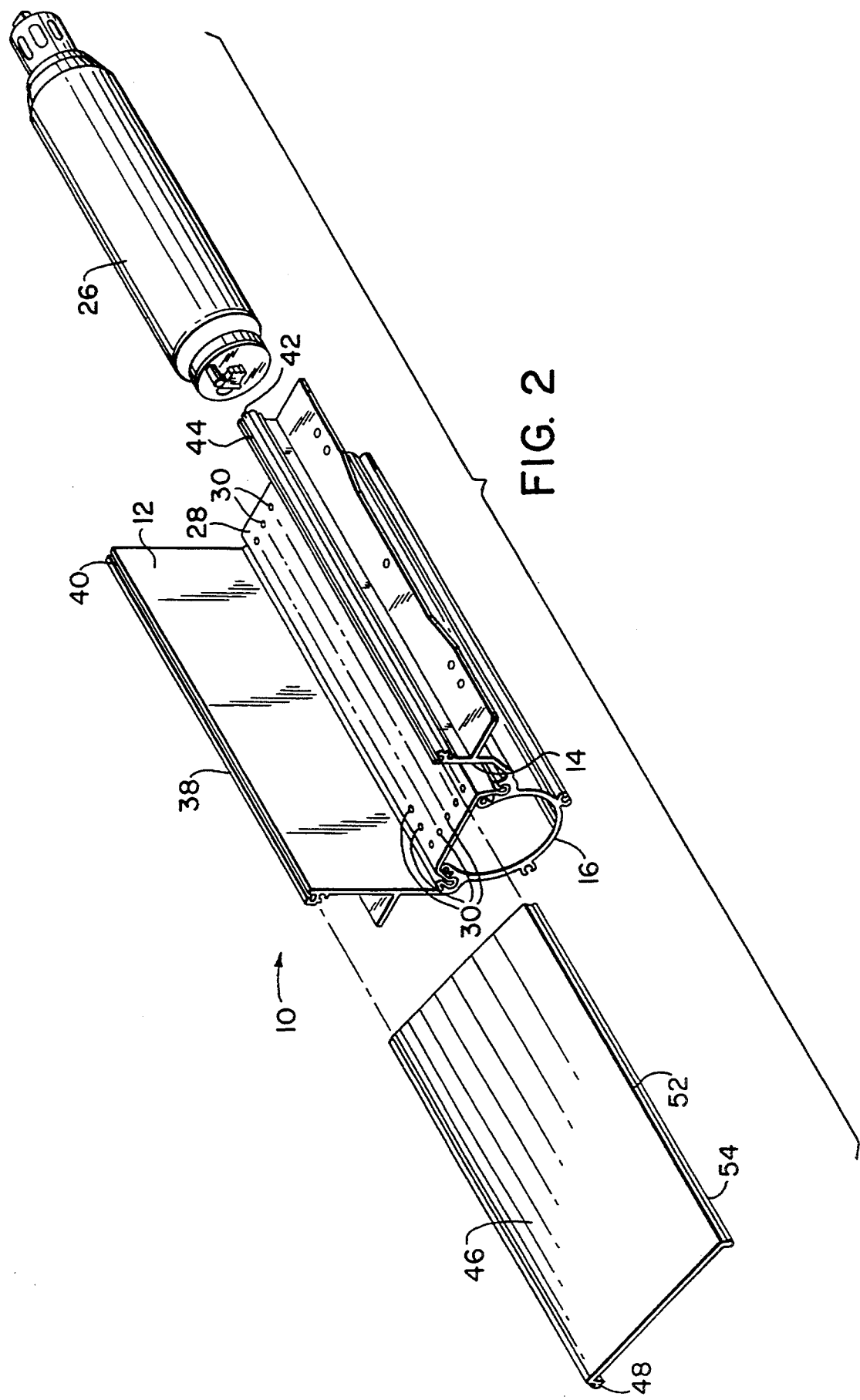

UNPERFORATED SLIDE-IN PASSENGER SIDE AIRBAG MODULE CUSHION COVER

TECHNICAL FIELD

This invention relates to passenger side vehicular airbag modules. More particularly, it relates to an improved cushion cover for such a module.

BACKGROUND ART

Most passenger side airbag modules employ cushion covers. The term "cushion" as used herein means the folded and undeployed airbag. The purposes of the cover are to prevent foreign objects from lodging inside the cushion and to retain the cushion fold until the module is installed in a vehicle and a deployment door is attached over it. Cushion covers presently employed may be made of plastic fiber papers such as Tyvek (a DuPont trademark), woven fabric, or injection molded or die cut sheet plastic. These prior art cushion covers are normally secured to the module by means of adhesive bonding, sewing, or fastening with screws or rivets. They are designed with perforated lines or tear seams which are designed to split when the airbag deploys. The cover portions then swing open allowing full deployment of the airbag.

The prior art cushion covers have a number of disadvantages. First, as previously explained, they require the use of fasteners or adhesives, thereby complicating the task of assembly. Second, the presence of a perforation or tear line invites inadvertent splits due to handling prior to or during installation. Finally, the presence of two relatively small and newly formed "doors" presents the possibility of snagging of the airbag which could thereby destroy its ability to function as a life saving element.

Accordingly it is a primary object of the present invention to provide a cushion cover for a passenger side airbag module which does not require the use of fasteners or adhesives. Another object is to provide such a cover which is unperforated and thereby resistant to inadvertent splitting. Another object of the present invention is to provide such a cover which provides a relatively wide guide flap against which the airbag may deploy to reduce the possibility of snags. Other objects, features, and advantages will become apparent from the following description and appended claims.

DISCLOSURE OF INVENTION

An automotive airbag module assembly includes a trough-shaped reaction canister which has first and second end plates and first and second sidewalls defining an open mouth. Housed within the canister is an inflator and a folded airbag. A cover is provided which substantially closes the open mouth of the canister by means of first and second splines formed on opposite edges of the cover. The sidewalls of the canister define first and second grooves which receive the first and second splines, respectively. One of the groove/spline combinations forms a firm attachment which securely anchors one edge of the cover. The other spline/groove combination is designed with a snap-fit engagement so that it disengages under the influence of the expanding airbag.

BRIEF DESCRIPTION OF THE DRAWINGS

FIG. 2 is an exploded isometric view of the assembly of this invention with the end plates omitted, illustrating the relationship of the components.

BEST MODE FOR CARRYING OUT THE INVENTION

Figure 1:
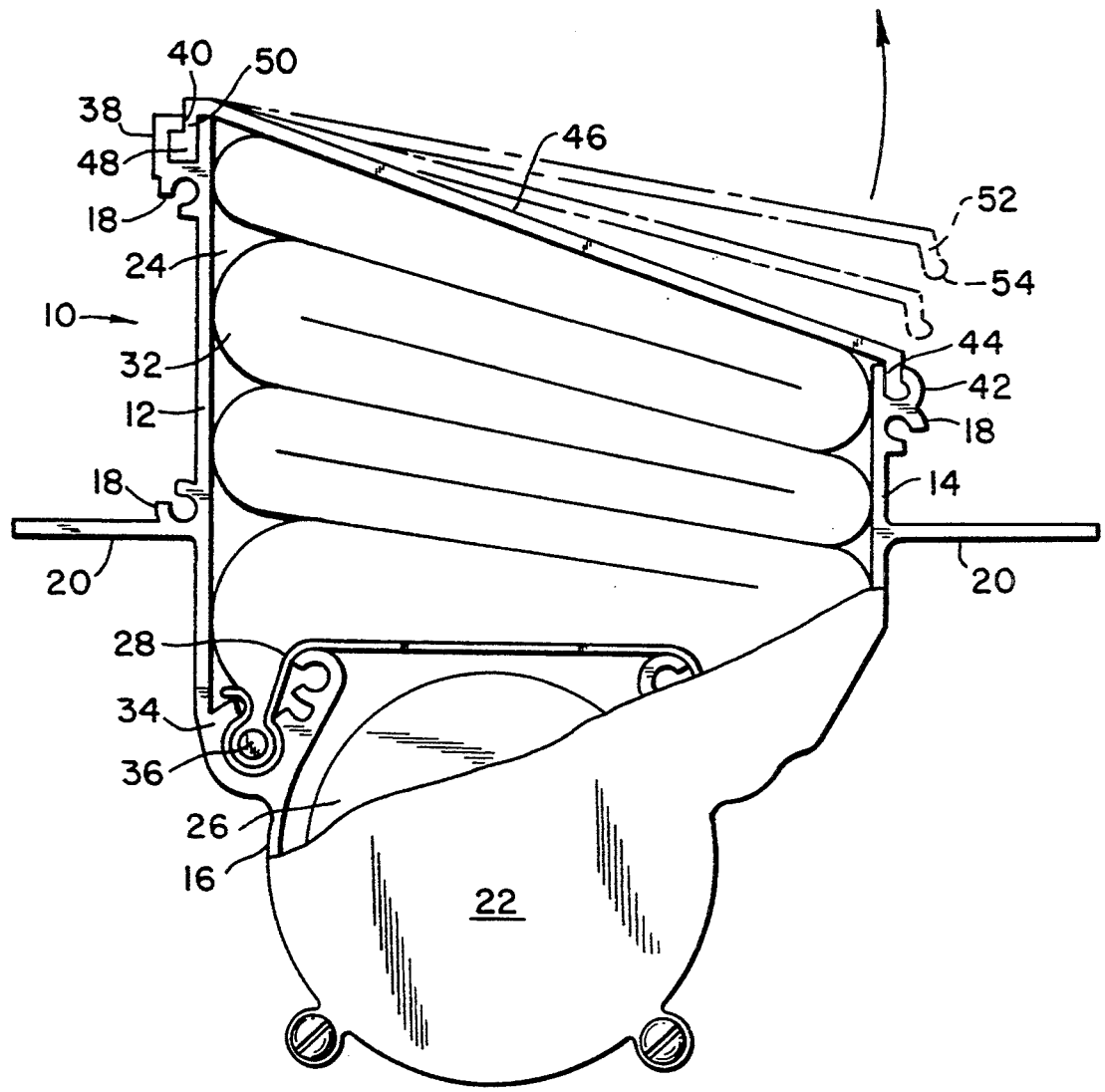
FIG. 1 is an end view of an airbag module assembly in accordance with this invention with one end plate partially broken away to illustrate its internal construction.

FIGS. 1 and 2 illustrate a passenger side airbag module comprising a reaction canister 10 which may be extruded from a material such as aluminum. The reaction canister 10 is trough-shaped and includes spaced, substantially parallel, sidewalls 12, 14 which extend upwardly from the sides of a semi-cylindrical inflator housing 16. The inflator housing 16 serves to close the bottom of the trough shaped reaction canister 10. The extruded reaction canister 10 includes conventional screw preparations 18 and mounting extensions 20 as required for the specific installation. The screw preparations 18 are conventional and serve to mount the endplates 22, 24 which close the ends of the reaction canister 10.

Housed within the inflator housing 16 is a conventional inflator 26. The open top of inflator housing 16 is closed by a combination cushion retainer and diffuser plate 28. The diffuser plate 28 defines a plurality of gas inlet openings 30. The gas inlet openings 30 cause the gas from inflator 26 to be diffused into the open mouth of a folded airbag 32 housed within the reaction canister 10. The diffuser plate 28 is retained within a pair of channels 34 (one being illustrated in FIG. 1) and opposed edges of the airbag mouth are retained within the same channels by means of rods 36. None of the features so far described constitute the present invention and accordingly will not be described in more detail.

In accordance with the present invention, the upper edge of the sidewall 12 of reaction canister 10 defines a locking channel 38. The locking channel 38 is characterized by a relatively large square cross-section and a longitudinal slot 40 which extends along the length of the reaction canister 10. The opposite sidewall 14 of the reaction canister 10 defines a semi-cylindrical latching channel 42 which also includes a longitudinal slot 44 running the length of the reaction canister 10.

The top of the reaction canister 10 is closed by a plastic cushion cover 46 which is substantially planar and rectangular and is characterized by a lack of perforations or tear lines. One of the major edges of the cushion cover 46 is formed with a spline 48 which has a substantially square cross-section to fit within the locking channel 38. The spline 48 depends from a flange 50 on the cushion cover 46. The thinness of the flange 50 allows it to pass through the slot 40 in locking channel 38.

The opposite longitudinal edge of the cushion cover 46 also carries a depending flange 52 which terminates in an enlarged bead-like (in cross section) spline 54. The sizes of the flange 52 and the spline 54 are such that the spline may make a snap-fit engagement through the slot 44 of latching channel 42 whereby the spline 54 is housed within the latching channel 42 while the flange 52 rests within the slot 44.

The cushion cover 46 of this invention is installed on the reaction canister 10 after the installation of the folded airbag 32. The spline 48 is inserted into the end of the locking channel 38 with the flange 50 extending through the slot 40. No more than one of the endplates 22, 24 has been installed at this juncture. The cushion cover 46 slides along the length of the reaction canister 10 and thereafter the opposite edge of the cover is pushed downward, causing the spline 54 to enter into a snap-fit engagement with the latching channel 42. Alternatively, of course, the spline 54 could be inserted into the end of the latching channel 42 in the same manner as the spline 48 is inserted into the locking channel 38.

The completed assembly may be mounted in the vehicle with the cushion cover 46 mounted behind the breakaway dashboard portion. Alternatively, the cushion cover 46 may itself form a portion of the dashboard. In any event, when the unit is actuated, the airbag 32 begins to expand. The force of the expansion causes the spline 54 to disengage from the latching channel 42 allowing the cushion cover 46 to swing open in a counterclockwise rotation as viewed in FIG. 1 and as illustrated by the arrow. As the cushion cover 46 opens, it forms a guide flap against which the airbag 32 may deploy, thereby reducing the possibility of snags.

It is believed that the many advantages of this invention will now be apparent to those skilled in the art. It will also be apparent that a number of modifications may be made therein without departing from its spirit and scope. For example, the locking channel 38 and the spline 48 are described as being of square cross section. However, it is only required that they be so configured as to form a relatively permanent engagement which resists separation by the force of the expanding airbag. Accordingly, the foregoing description is to be construed as illustrative only rather than limiting. This invention is limited only by the scope of the following claims.

We claim:

1. In an automotive airbag module assembly including a trough-shaped reaction canister having first and second end plates and first and second sidewalls defining an open mouth, an inflator housed within said canister, a folded airbag within said canister, and a cover substantially closing the open mouth of said canister, the improvement comprising:
   a first, locking, channel defined by said first sidewall adjacent the open mouth of said canister;
   a second, latching, channel defined by said second sidewall adjacent the open mouth of said canister;
   a first, locking, spline carried by said cover and retained within said first channel; and
   a second, latching, spline carried by said cover and retained within said second channel.

2. The improvement of claim 1 wherein said first spline is retained within said first channel throughout deployment of said airbag.

3. The improvement of claim 2 wherein said second spline is disengaged from said second channel by the force of the expanding airbag.

4. The improvement of claim 3 wherein said second spline is in snap-fit engagement with said second channel.

5. The improvement of claim 2 wherein said first spline is engageable with said first channel solely by longitudinal insertion therein.

6. The improvement of claim 5 wherein said second spline is disengaged from said second channel by the force of the expanding airbag.

7. The improvement of claim 6 wherein said second spline is in snap-fit engagement with said second channel.

* * * * *